United States Patent [19]

Zimmer

[11] Patent Number: 5,252,050
[45] Date of Patent: Oct. 12, 1993

[54] OPTICAL FIBER RIBBONIZER

[75] Inventor: Rainer M. Zimmer, Hickory, N.C.

[73] Assignee: Siecor Corporation, Hickory, N.C.

[21] Appl. No.: 828,628

[22] Filed: Jan. 31, 1992

[51] Int. Cl.[5] .................................. B29C 47/02
[52] U.S. Cl. ................................ 425/113; 425/114;
 425/133.5; 425/461; 425/462; 156/296;
 156/500; 264/174
[58] Field of Search ............... 65/4.21, 4.3, 4.4;
 264/1.6, 172, 174; 425/113, 114, 133.5, 87, 458,
 461, 462, DIG. 57; 156/500, 501, 244.11, 296;
 118/405, 419, 420; 222/146.2, , 146.5

[56] References Cited

U.S. PATENT DOCUMENTS

| | | | |
|---|---|---|---|
| 2,979,431 | 4/1961 | Perrault | 425/113 |
| 3,551,640 | 12/1970 | Duke, Jr. | 425/113 |
| 3,953,006 | 4/1976 | Patarcity et al. | 425/207 |
| 4,096,973 | 6/1978 | Cheeko | 425/217 |
| 4,274,821 | 6/1981 | Kiemer | 425/114 |
| 4,478,778 | 10/1984 | Look | 425/114 |
| 4,997,258 | 3/1991 | Oestreich | 350/96.23 |
| 5,067,830 | 11/1991 | McAlpine et al. | 385/114 |

Primary Examiner—Jay H. Woo
Assistant Examiner—Khanh P. Nguyen
Attorney, Agent, or Firm—J. David Abernethy

[57] ABSTRACT

Disclosed is a light waveguide ribbon mold having a nozzle port shaped to closely receive the heated nozzle of a portable melt adhesive gun. Light waveguides are pulled by hand through a slot in the mold so that the melt adhesive forms a ribbon matrix around the light waveguide. The ribbon cools and hardens upon exiting from the mold.

4 Claims, 3 Drawing Sheets

OPTICAL FIBER RIBBONIZER

BACKGROUND OF THE INVENTION

The invention uses a mold for ribbonizing light waveguides, also known as optical fibers.

Various devices have been used in the past for ribbonizing light waveguides. One such device is disclosed in U.S. Pat. No. 3,920,432, assigned to Bell Labs.

Because devices are now contemplated to splice light waveguide ribbons to each other, devices are also now needed which can be used in an outdoor environment to quickly and safely ribbonize a number of loose light waveguides.

SUMMARY OF THE INVENTION

The present invention uses a simple ribbonizing mold which does not require the use of adhesive sprays and can be used in the field by craftspersons. Commercially available portable melt adhesive guns are available; such guns typically have conical heated nozzles. A mold is provided having a nozzle port therein shaped to closely receive the heated gun nozzle. A rectangular slot passes through the mold in communication with the nozzle port via an interconnection channel. The operator uses the melt adhesive gun to inject melt adhesive into the slot and, at the same time, pulls a plurality of light waveguides through the slot, thereby coating the light waveguides in a rectangular matrix of melt adhesive. As the light waveguides emerge from the slot, the melt adhesive cools, forming a stable ribbon around the light waveguides. Optionally, means may be provided to removably attach the melt adhesive gun to the mold while the process is in operation. The slot lies between the nozzle port and a reservoir adapted to receive liquid melt adhesive to insure that the light waveguides are surrounded by melt adhesive while being pulled through the slot.

The mold is quite small and can be easily used by hand in the field. After the ribbon is complete, it may then be used for purposes desired by the operator such as mass ribbon splicing.

BRIEF DESCRIPTION OF THE DRAWINGS

The preferred embodiment is described in conjunction with the following drawings.

DETAILED DESCRIPTION OF THE PREFERRED EMBODIMENTS

Figure 1:
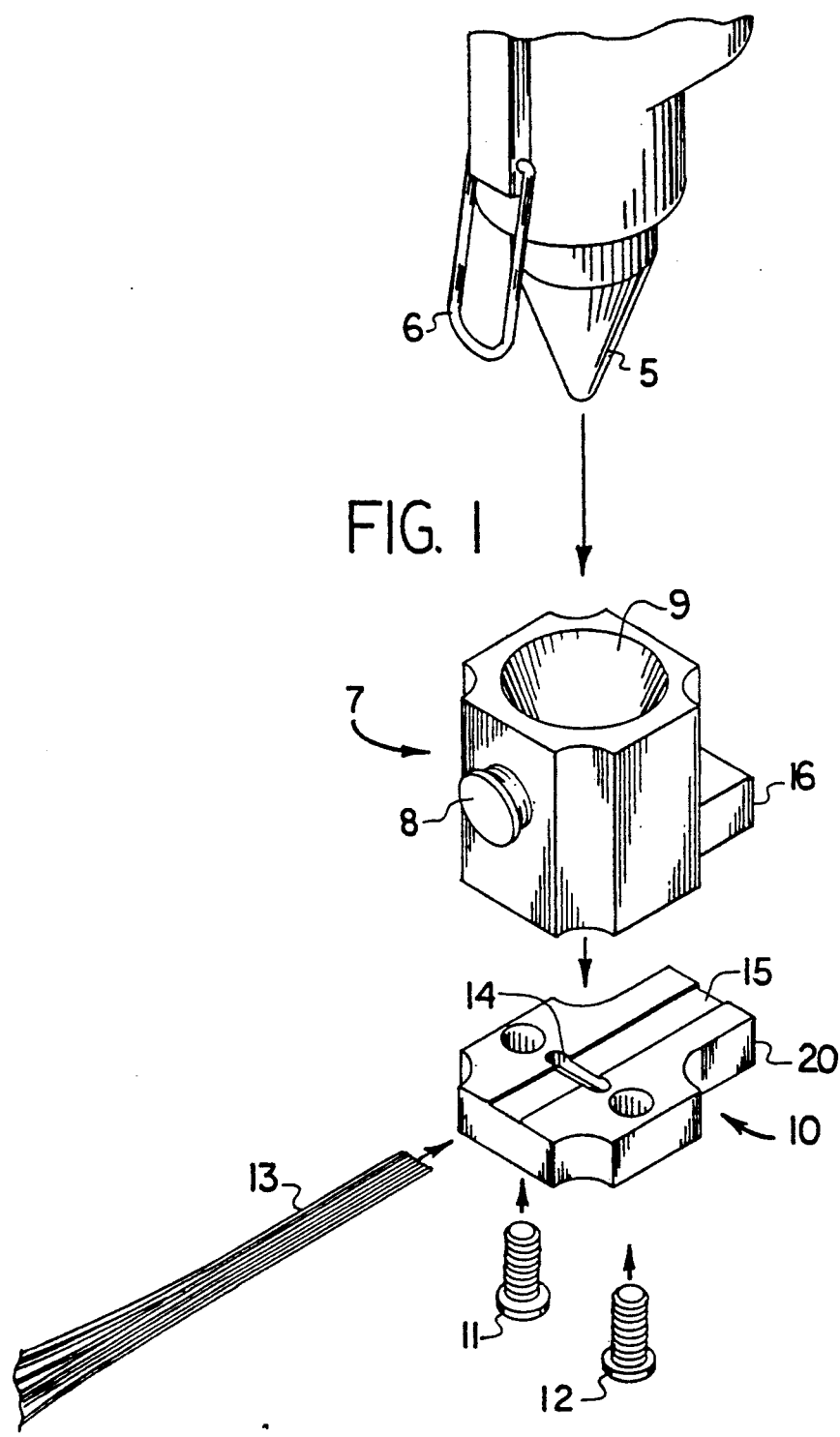
FIG. 1 is a perspective view of the disassembled mold.
Figure 2:
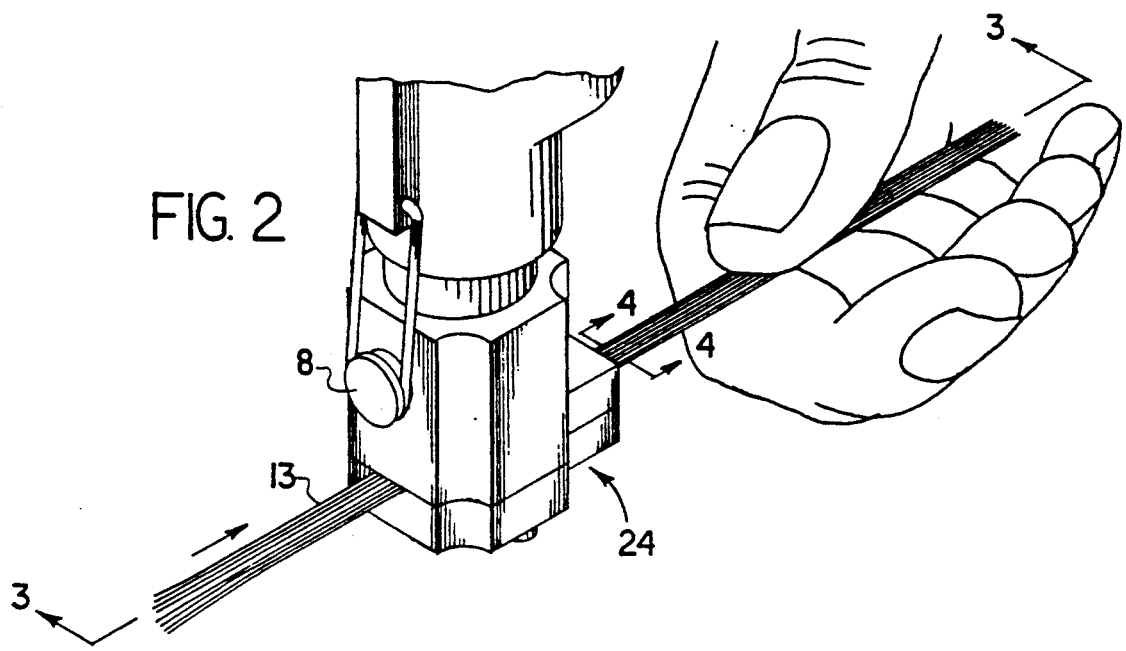
FIG. 2 is a perspective view of the assembled mold with light waveguides inserted therein.
Figure 3:
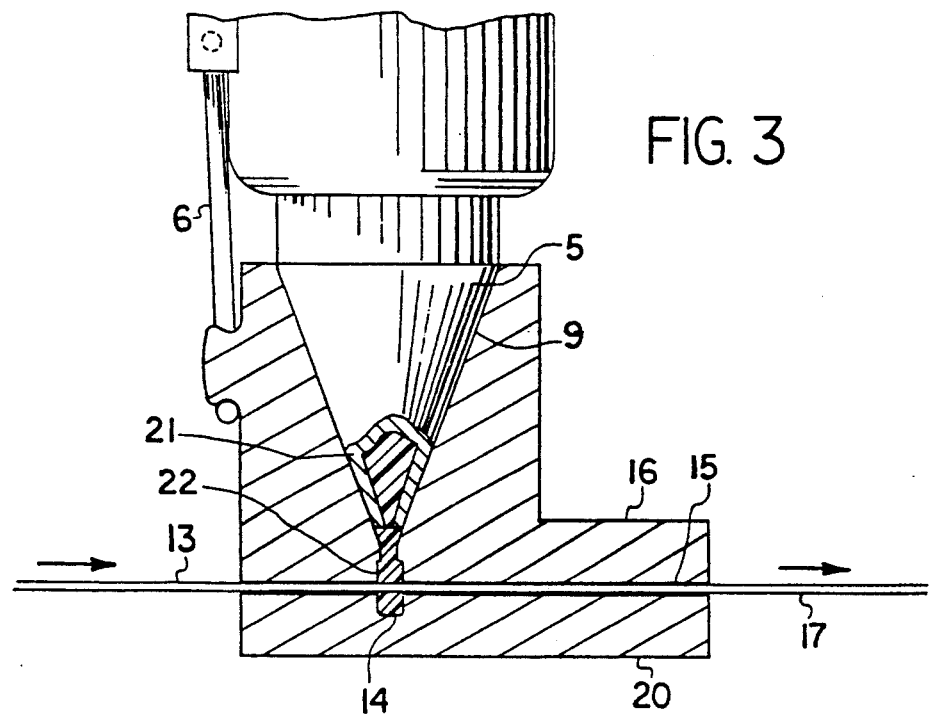
FIG. 3 is a partial sectional view of the mold during its operation.
Figure 4:
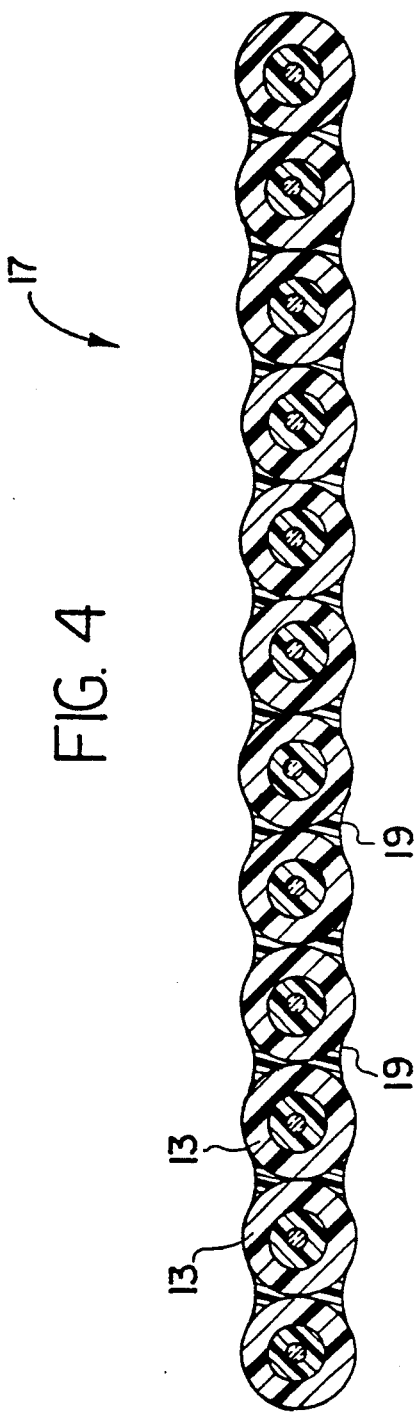
FIG. 4 is a cross-section of a completed ribbon after emerging from the mold.

The molding assembly according to the invention is shown in disassembled form in FIG. 1 and in assembled form in FIG. 2. Ribbon mold 24 consists of bottom mold section 10 and top mold section 7. Top mold section 7 has nozzle port 9 therein which is shaped to closely receive heated nozzle 5 of a portable hand held melt adhesive gun. Optionally, the melt adhesive gun may have a fastener for removably attaching the portable melt adhesive gun to the ribbon mold 24. In the preferred embodiment, clip 6 on the portable melt adhesive gun fastens over nozzle 8 on mold 24 during use.

Both top mold section 7 and bottom mold section 10 have matching slots 15 therein. When attached during use, such as by means of screws 11, 12, slots 15 form a rectangular opening for the passage of light waveguides 13.

In use, top mold section 7 and bottom mold section 10 are first disassembled. Light waveguides 13 are laid side to side in slot 15 of bottom mold section 10. Top mold section 7 is then attached to bottom mold section 10. Heated nozzle 5 is then introduced into nozzle port 9 and the gun trigger is squeezed to introduce melt adhesive 21 into reservoirs 22, 14. While the operator uses one hand to squeeze the gun trigger, the other hand is used to pull light waveguides 13 through ribbon mold 24. As light waveguides 13 pass through slot 15, they proceed past reservoirs 14, 22, are coated by melt 21 and passed through the L shaped projection of mold 24 formed by projections 16, 20. As ribbon 17 exits ribbon mold 24, melt adhesive 21 cools to form a ribbon matrix 19 around ribbonized light waveguides 13.

What is claimed is:

1. A light waveguide ribbonizer, comprising a portable melt adhesive gun having a heated nozzle; a light waveguide ribbon mold having (a) a nozzle port therein shaped to closely receive the gun nozzle and (b) a slot for the passage of light waveguides, said slot in communication with said port; and, means for removably attaching the portable melt adhesive gun to the light waveguide ribbon mold.

2. A light waveguide ribbonizer as recited in claim 1, the light waveguide ribbon mold further comprising a reservoir for receiving melt adhesive, the slot in communication with and between the reservoir and the nozzle port.

3. A light waveguide ribbonizer, comprising a portable melt adhesive gun having a heated nozzle; a light waveguide ribbon mold having (a) a nozzle port therein shaped to closely receive the gun nozzle and (b) a slot for the passage of light waveguides, said slot in communication with said port.

4. A light waveguide ribbonizer as recited in claim 3, the light waveguide ribbon mold further comprising a reservoir for receiving melt adhesive, the slot in communication with and between the reservoir and the nozzle port.

* * * * *